Patented Mar. 12, 1946

2,396,609

UNITED STATES PATENT OFFICE 2,396,609

METHOD OF PRODUCING METHACRYLYL CHLORIDE

Walter Schmidt, Frankfort-on-the-Main, Germany; vested in the Alien Property Custodian No Drawing. Application June 12, 1941, Serial No. 397,745. In Germany June 27, 1940

1 Claim. (Cl. 260—544)

The present invention relates to a method of producing methacrylic acid chloride.

The preparation of methacrylic acid chloride has not yet been described. Since, as it is known, methacrylic acid is easily transformed into polymeric methacrylic acid, especially in the presence of hydrochloric acid, a preparation on an industrial scale by splitting off hydrogen chloride from a chloro-isobutyric acid chloride seemed hardly to be possible on account of the hydrogen chloride formed thereby.

Now, I have found that, also in the presence of hydrogen chloride, methacrylic acid chloride may be obtained in a monomeric form by splitting off hydrogen chloride from beta-chloro-isobutyric acid chloride. Whereas the preparation of acrylic acid chloride from chloropropionic acid chloride is advantageously carried out in the gaseous phase, it has been found that the splitting off of hydrogen chloride from beta-chloro-isobutyric acid chloride with formation of methacrylic acid chloride is arrived at already in the liquid state so that the higher temperatures of the gaseous phase which give rise to polymerization losses are avoided. The splitting off of hydrogen chloride may be accelerated and facilitated by working in the presence of catalyzers splitting off acid. All known catalyzers splitting off hydrogen chloride are, however, not suitable; for instance, anhydrous barium chloride and magnesium chloride are hardly effective whereas others, such as iron oxide and zinc oxide, partly effect resinifications. When selecting the catalyzers, it must be borne in mind to combine a rapid reaction with as small as possible a secondary effect on the reaction products. Small additions of activated carbon, of a $MgO.MgCl_2$-catalyzer and of copper phosphate have proved to be especially suitable. When using other catalyzers, for instance phosphorus pentoxide, which enable the splitting off of hydrogen chloride already at low temperature but show secondary effects at higher temperatures, it is suitable to avoid higher temperatures by separating the resultant methacrylic acid chloride under reduced pressure. It is in general advisable to quickly carry away the methacrylic acid chloride which has been formed in order to avoid losses in polymerization, for instance, by using heated distilling tubes which, although they condense again and lead back the unchanged beta-chloro-isobutyric acid chloride, do not precipitate the methacrylic acid chloride which boils at essentially lower temperatures but lead it away rapidly. Since the splitting off of hydrogen chloride from beta-chloro-isobutyric acid chloride in the liquid phase gradually slows down, it is advantageous to interrupt it before the reaction is finished and to recover, advantageously by distillation under reduced pressure, that part which has not been reacted upon and to use it again. By a suitable apparatus the process may be carried out continuously.

The beta-chloro-isobutyric acid chloride used as parent material may be prepared by chlorination of alpha-methyl-propionyl-chloride. The process described allows of obtaining in a technically simple manner the methacrylic acid chloride hitherto not known but required since a long time as intermediate product particularly for the production of plastics.

Methacrylic acid chloride is a liquid clear as water which boils under a pressure of 50 mm. at 42° C.

The following examples serve to illustrate the invention but they are not intended to limit it thereto; the parts are by weight:

(1) 250 parts of beta-chloro-isobutyric acid chloride are heated in a round-bottomed flask which is connected with a distilling tube heated by means of steam. The temperature is regulated so that it does not exceed 100° C. in the middle of the tube and 95° C. at the place where the distillate passes over. The methacrylic acid chloride formed is condensed by a cooler and separated from the hydrogen chloride. Since after a heating of 8½ hours the evolution of hydrogen chloride slows down, the operation is stopped at this point. The distillate amounts to 74.5 parts and, when rectified under reduced pressure, passes over almost entirely at 42° C. under a pressure of 50 mm. The unchanged beta-chloro-isobutyric acid chloride—i. e. 132 parts—is distilled under a pressure of 50 mm. so that 92% are recovered which may be used for a new batch.

(2) It is worked as indicated in Example 1 but with addition of 2.5 parts of activated carbon (phosphoric acid peat charcoal). The evolution of hydrogen chloride sets in more vividly and already at lower temperatures than without the addition of the catalyzer. After 6 hours, 113.5 parts of methacrylic acid chloride have distilled and the evolution of hydrogen chloride has slowed down. The residue amounts to 85 parts, of which 75 parts are recovered by distillation under reduced pressure as unchanged beta-chloro-isobutyric acid chloride.

(3) Crystallized magnesium chloride,

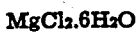

is for the mosts part dehydrated by heating and 2.5 parts of the resultant chloride containing magnesium oxide are used as catalyzer in a batch as described in Example 1. In the course of 6 hours, 117 grams of distillate are obtained and 74 parts remain as residue. Anhydrous molten magnesium chloride works essentially slower than the chloride containing magnesium oxide, whereas magnesium chloride alone gives rise to losses by resinification of part of the residue.

(4) It is proceeded as indicated in Example 1 but with addition of 1% of copper phosphate. After 9 hours heating, 96 parts of methacrylic acid chloride are obtained as well as 90.5 parts of residue from which 80% of the parent material may be recovered.

(5) Phosphorus pentoxide as catalyzer gives rise to an early evolution of hydrogen chloride but also to a carbonization of part of the residue. The disadvantageous secondary effect of the otherwise active catalyzer can be avoided for the most part by performing the splitting off of the hydrogen chloride under reduced pressure. Under a pressure of 200 mm. 117.5 parts of the distillate pass over at a temperature of 60° C.–70° C. The residue, 90.5 parts, is carbonized only to a small extent so that 85% thereof may be recovered and used again as parent material. Since the crude methacrylic acid chloride contains still a small quantity of carried-over beta-chloro-isobutyric acid chloride, it is advantageously subjected to a rectification under reduced pressure.

I claim:

The process of producing monomeric methacrylic acid chloride which comprises dehydrohalogenating beta-chloro-isobutyric acid chloride, by heating the said chloride in the liquid phase in the presence of activated carbon as a dehydrohalogenation catalyst to split off hydrogen chloride.

WALTER SCHMIDT.